(12) United States Patent
Murray et al.

(10) Patent No.: US 7,708,324 B2
(45) Date of Patent: May 4, 2010

(54) COLLISION BARRIER DEVICE FOR PROJECTING LOADS

(75) Inventors: Richard Murray, Sayville, NY (US); Thomas Spinelli, East Northport, NY (US)

(73) Assignee: Omnitek Partners LLC, Bayshore, NY (US)

( * ) Notice: Subject to any disclaimer, the term of this patent is extended or adjusted under 35 U.S.C. 154(b) by 75 days.

(21) Appl. No.: 11/985,440

(22) Filed: Nov. 15, 2007

(65) Prior Publication Data

US 2008/0143126 A1 Jun. 19, 2008

Related U.S. Application Data

(60) Provisional application No. 60/859,191, filed on Nov. 15, 2006.

(51) Int. Cl.
*B60R 19/26* (2006.01)

(52) U.S. Cl. .......................... 293/133; 404/6

(58) Field of Classification Search ................ 296/133, 296/102, 187.03; 256/13.1; 404/6; 293/133, 293/102
See application file for complete search history.

(56) References Cited

U.S. PATENT DOCUMENTS

| | | | | | |
|---|---|---|---|---|---|
| 4,385,771 | A | * | 5/1983 | Eckels | 280/400 |
| 4,674,911 | A | * | 6/1987 | Gertz | 404/6 |
| 5,199,755 | A | * | 4/1993 | Gertz | 293/120 |
| 5,248,129 | A | * | 9/1993 | Gertz | 256/13.1 |
| 5,947,452 | A | * | 9/1999 | Albritton | 256/13.1 |
| 7,341,397 | B2 | * | 3/2008 | Murphy | 404/6 |
| 2003/0165356 | A1 | * | 9/2003 | Breed | 404/6 |

* cited by examiner

*Primary Examiner*—Patricia L Engle
*Assistant Examiner*—Pinel E Romain

(57) ABSTRACT

A crash barrier device including: a body portion having at least an impact portion; and a fastening portion configured to fasten the body portion to a projecting load being carried by a vehicle; wherein the impact portion and fastening portion are configured such that the impact portion is nearer to a surface traveled on by the vehicle than the fastening portion. A system for carrying projecting loads is also provided and includes: a trailer having wheels and fastener(s) for fastening the trailer to a powered vehicle; and the crash barrier device.

25 Claims, 8 Drawing Sheets

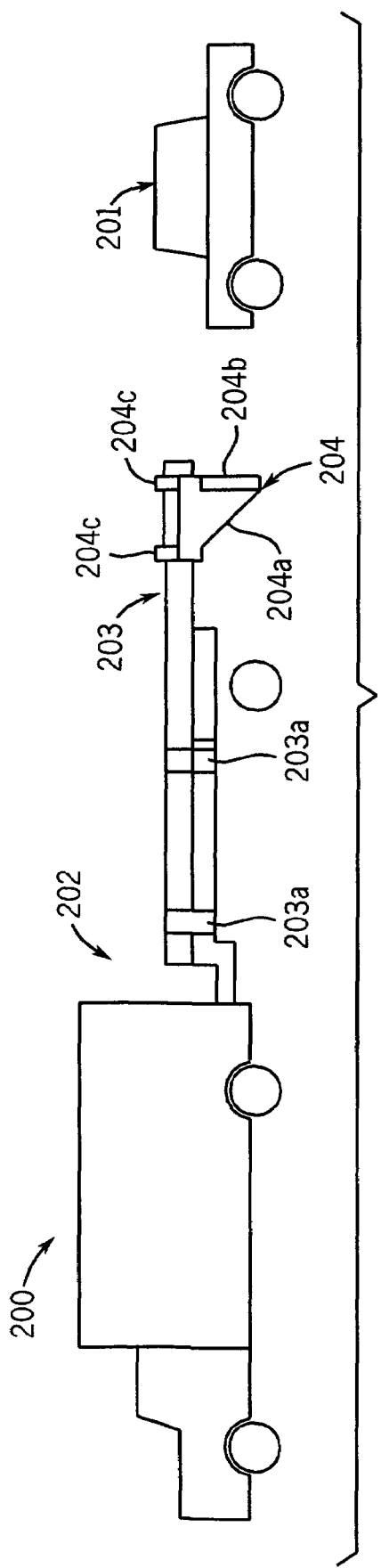
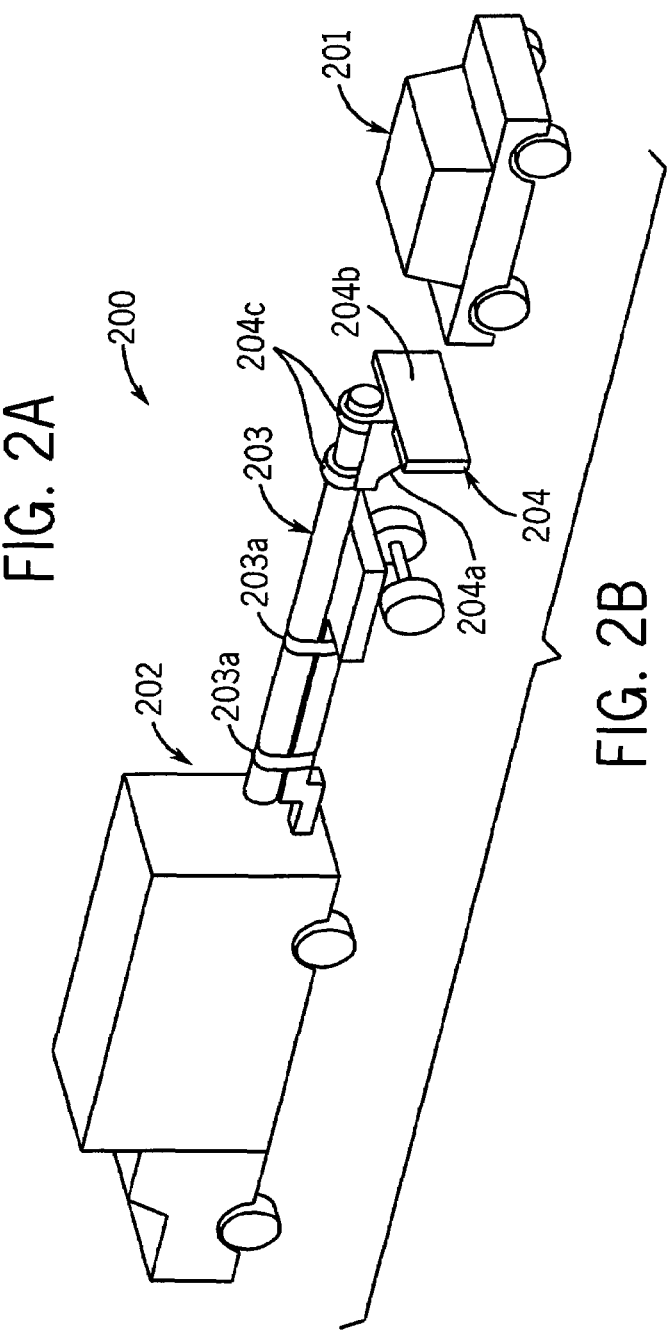
FIG. 2A
FIG. 2B

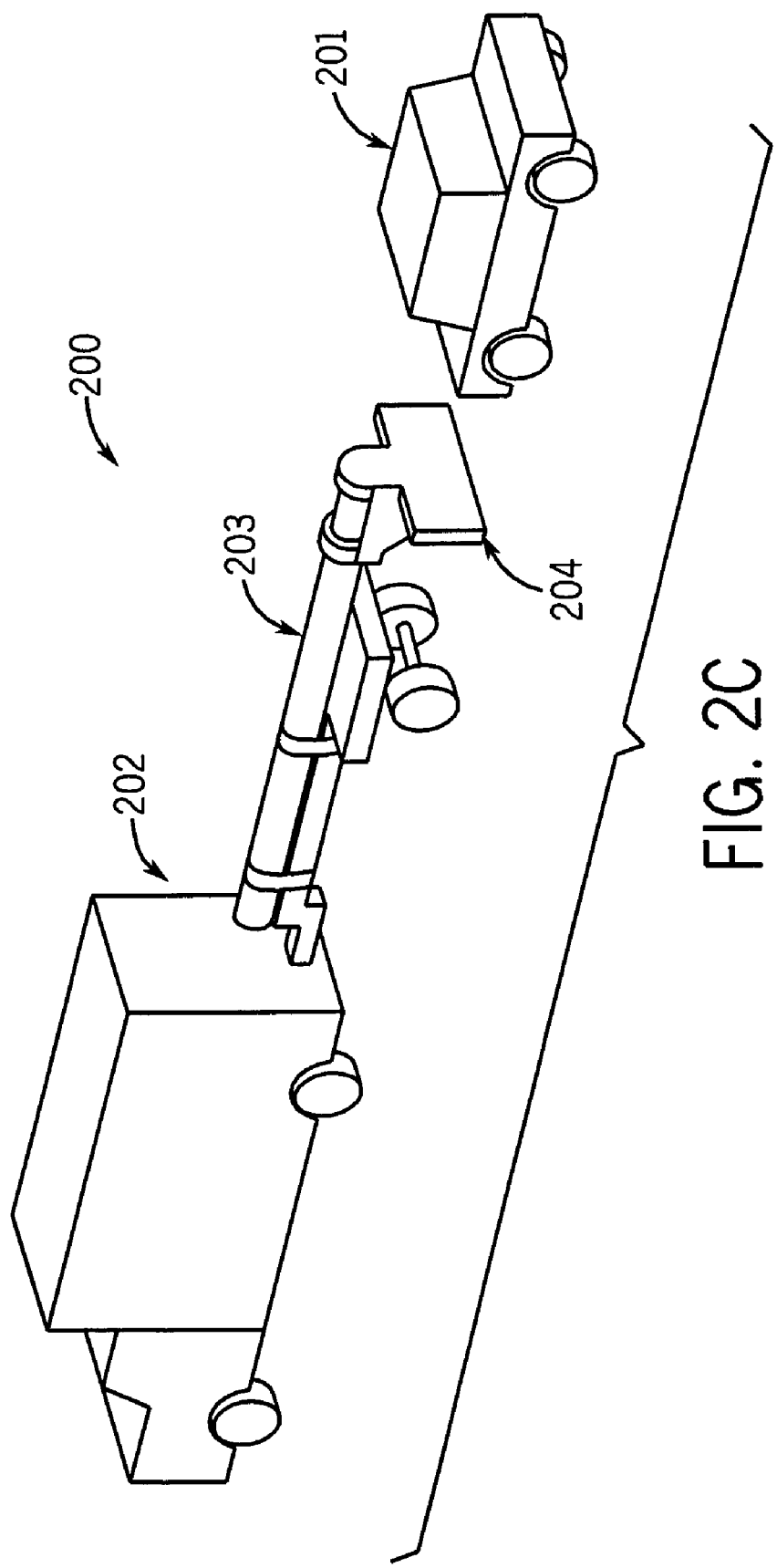

COLLISION BARRIER DEVICE FOR PROJECTING LOADS

CROSS-REFERENCE TO RELATED APPLICATION

This application claims the benefit of provisional application Ser. No. 60/859,191 filed on Nov. 15, 2006, the contents of which is incorporated herein by reference.

BACKGROUND

1. Field of the Invention

The present invention relates generally to automotive collision avoidance, and mitigation or attenuation, and more specifically to avoiding or mitigating vehicle collisions between cargo carried as a projecting load and any other vehicle.

2. Prior Art

The basis of providing vehicle bumpers is to provide a durable collision interface with relatively large surface area to transmit the collision force to the vehicle chassis regardless of the point of impact or the distribution of collision forces. Once transmitted to the chassis, the impact forces are transmitted to the vehicle occupants via safety belts and/or air bags. This widely employed method works to lessen the effects of highly concentrated impacts, such as those with trees or support columns.

There exists, however, a common and necessary highway transport practice which, if involved in a collision, never allows for any current automobile safety system to mitigate the impact.

In transporting long non-separable loads, such as utility poles, on commercial motor vehicles, it is common practice to secure the majority of the load to the truck or trailer, and allow a significant portion of the load to project rearward beyond the extent of the truck or trailer frame. This practice may result from the need to transport loads, sometimes exceeding 100' in length, on roads and highways while maintaining a relatively short vehicle wheelbase for maneuverability. Alternately, a motor carrier may have to, on occasion, transport a load which is not exceptionally long in absolute terms, but is longer than the equipment can accommodate without projection. In either case, the projected load presents a grave danger to other vehicles, especially automobiles, because of two intrinsic geometric parameters of the projecting load.

First, the nature of heavy truck and trailer design and manufacture yields cargo carrying decks which are 3.0'-5.0' above grade level. This height directly corresponds to the elevation above the front/hood area and below the roof of most passenger vehicles (i.e., the height of a vehicle windshield). If a passenger vehicle collides with a projecting load, the end of the projecting load will pierce the windshield of the automobile, exposing the occupants to extraordinary risk of severe injury or death.

Second, projecting loads generally exhibit a high slenderness ratio i.e. the longitudinal dimension is much, much larger than the cross-sectional dimensions. For example: a truck/trailer combination carrying a projecting size #1 utility pole will typically be only 1.0' in diameter. This slenderness has two consequent effects: First, in combination with the load height above grade, the driver of a vehicle behind the projecting load is viewing only the cross section of the load. This means that the following driver has only a small area of focusing surface on which to judge his proximity to the projecting load (0.78 ft$^2$ in the case of the #1 utility pole). This can easily lead to the eyes of the following driver focusing on the much larger surface area of the rear truck or trailer frame, which would underestimate the proximity by the projection distance, which is commonly 8.0'-12.0' and often more as regulations stipulate no maximum projection. In addition to misjudgment of proximity, in the event of a collision with a projecting load the typical slenderness of projecting loads concentrates the impact force on a small area. This, combined with the typical mass, rigidity, and secure attachment of projected loads (utility poles, bridge trusses, I-beams, etc) when compared to the strength of the upper portion of a passenger vehicle, results in the immediate deformation and failure of the passenger vehicle components (windshield, roof, etc.) and exposure of the passengers to the risk of severe injury or death in any collision of appreciable magnitude.

In addition to bumpers, safety belts, and other systems simply transmitting impact forces to vehicle occupants, highway safety advancements such as air bags, crumple zones, and inertia-absorbing highway barriers, have made great strides in reducing casualties resulting from automobile collisions by attenuating the forces resulting from collisions of all magnitudes. The basic principle on which all these systems operate is as follows: the net kinetic energy of the impact is dissipated or absorbed by deformation of some mitigation material or structure. This process lowers the peak transmitted forces while lengthening the time over which any unabsorbed forces are transmitted. Based on the well-documented success of such devices, any collision barrier or bumper will benefit from the addition of an additional mitigation system.

SUMMARY

Accordingly, a crash barrier device is provided. The crash barrier device comprises: a body portion having at least an impact portion; and a fastening portion configured to fasten the body portion to a projecting load being carried by a vehicle; wherein at least a portion of the impact portion and the fastening portion are configured such that the impact portion is nearer to a surface traveled on by the vehicle than the fastening portion.

The fastening portion can comprise one or more clamps. The one or more clamps can comprise two clamps.

The body portion and impact portion can be integrally formed.

The fastening portion can comprise a closed end for fitting over a corresponding end of the projecting load to prevent movement, in the direction of travel of the vehicle, of the body portion and projecting load.

The crash barrier device can further comprise an impact mitigation system for absorbing at least a portion of an impact on the impact surface. The impact mitigation system can comprise a pleated container disposed on at least a portion of the impact surface. The crash barrier device can further comprise one of a solid, semi-solid, liquid or gel disposed in a cavity of the pleated container.

The crash barrier device can further comprise one or more wheels rotatably disposed on the body portion and configured so as to have a surface thereof rotatably contact the surface upon which the vehicle travels.

The fastening portion can comprise a protrusion disposed on the body portion and having at least a portion fitted over a corresponding end of the projecting load to prevent movement, in the direction of travel of the vehicle, of the body portion and projecting load.

Also provided is a system for carrying projecting loads from a vehicle. The system comprising: a trailer having at least one set of wheels and means for fastening the trailer to a powered vehicle; and a crash barrier device having: a body portion having at least an impact portion; and a fastening portion configured to fasten the body portion to a projecting load being carried by a vehicle; wherein at least a portion of the impact portion and the fastening portion are configured such that the impact portion is nearer to a surface traveled on by the vehicle than the fastening portion.

The system can further comprise an impact mitigation system for absorbing at least a portion of an impact on the impact surface disposed at a forward end, in the direction of vehicle travel of the trailer. The impact mitigation system can comprise a pleated container. The system can further comprise one of a solid, semi-solid, liquid or gel disposed in a cavity of the pleated container. The system can further comprise a plate for distributing an impact across at least a portion of a surface area of the pleated container. The plate can include a hole for accepting a corresponding forward end portion, the direction of vehicle travel, of the projecting load.

The fastening portion can comprises one or more clamps. The one or more clamps can comprise two clamps.

The body portion and impact portion can be integrally formed.

The fastening portion can comprise a closed end for fitting over a corresponding end of the projecting load to prevent movement, in the direction of travel of the vehicle, of the body portion and projecting load.

The system can further comprise one or more wheels rotatably disposed on the body portion and configured so as to have a surface thereof rotatably contact the surface upon which the vehicle travels.

The fastening portion can comprise a protrusion disposed on the body portion and having at least a portion fitted over a corresponding end of the projecting load to prevent movement, in the direction of travel of the vehicle, of the body portion and projecting load.

The system can further comprise fastening means for fastening the projecting load to the trailer.

Further yet provided is a method for attenuating an impact of a first vehicle on a second vehicle carrying a projecting load. The method comprising: fastening a body portion having at least an impact portion to an end portion of the projecting load; and configuring at least a portion of the impact portion and the fastening portion such that the impact portion is nearer to a surface traveled on by the vehicle than the fastening portion so as to lower a point of the impact towards a surface traveled on the first and second vehicles.

The method can further comprise providing the impact portion with a surface area greater than a surface area of the end portion of the projecting load so as to increase a likelihood that an operator of the first vehicle will be aware of a proximity to the projecting load.

BRIEF DESCRIPTION OF THE DRAWINGS

These and other features, aspects, and advantages of the apparatus and methods of the present invention will become better understood with regard to the following description, appended claims, and accompanying drawings where:

FIG. 1b illustrates an isometric view of the collision interaction schematic of FIG. 1a.

FIG. 2a illustrates a side view of a collision interaction system between an automobile and a projecting load with a collision barrier device for projecting loads.

FIG. 2b illustrates an isometric view of the collision interaction system of FIG. 2a.

FIG. 2c illustrates an isometric view of a variation of the collision barrier device of FIG. 2b.

FIG. 3b illustrates an isometric view of the collision interaction system of FIG. 3a.

FIG. 4b illustrates an isometric view of the collision barrier device of FIG. 4a.

FIG. 5b illustrates an isometric view of the collision barrier device of FIG. 5a.

FIG. 5c illustrates a detailed isometric view of the collision barrier device of FIG. 5a.

FIG. 6b illustrates an isometric view of the collision interaction system of FIG. 6a.

DETAILED DESCRIPTION

Although this invention is applicable to attenuating any impact between two objects whose intended impact points are misaligned, it is particularly useful in mitigating rear-end collisions between passenger vehicles or light trucks and projecting loads carried by commercial vehicles. Therefore, without limiting the applicability of the present invention to mitigation of rear-end collisions between passenger vehicles or light trucks and projecting loads carried by commercial vehicles, it will be described in such an environment.

Furthermore, although this invention is applicable to numerous and various types of projecting loads, it has been found particularly useful in the environment of utility poles. Therefore, without limiting the applicability of the invention to utility poles, the invention will be described in such environment.

Figure 1A:
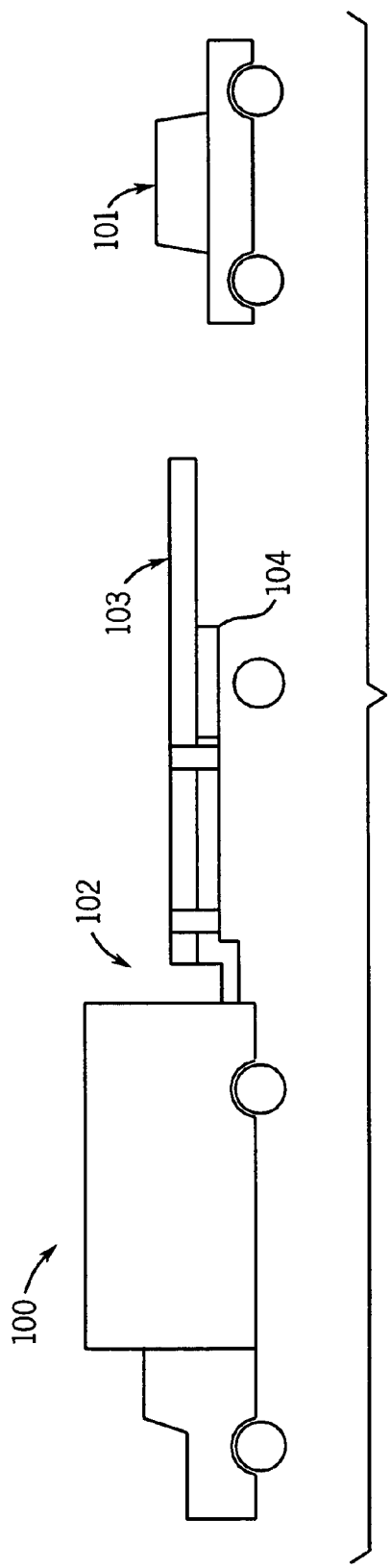
FIG. 1a illustrates a side view of a collision interaction schematic of the prior art between an automobile and a projecting load.
Figure 1B:
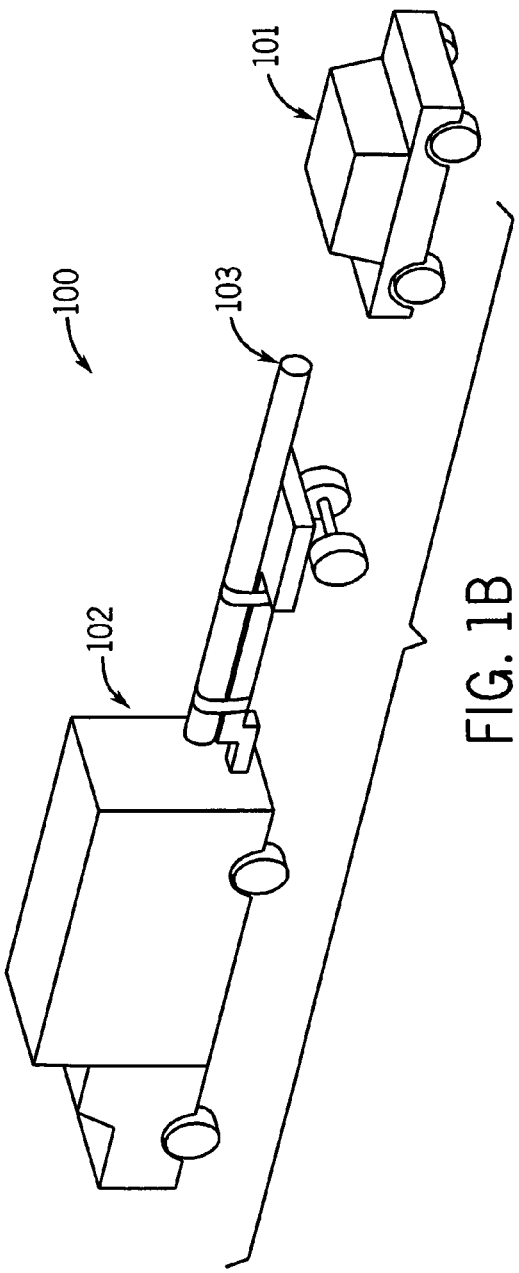

Referring now to FIGS. 1a and 1b, there is illustrated a collision interaction schematic of the prior art generally referred to by reference numeral 100. The collision interaction schematic 100 shows an automobile 101 following a truck-semitrailer combination 102. The truck is generally powered and the trailer is generally attached to the trailer by well known means in the art, such as a trailer hitch or any kind of pivoting or rotating joint. The truck-semitrailer combination 102 is shown carrying a projecting load 103 which is elevated and projecting past the rearmost point 104 of the truck-semitrailer 102 proper. It is clear that, by examining the collision interaction schematic 100, if the automobile 101 collides with the projecting load 103, the projecting load 103 will pierce the passenger compartment of the automobile 101 and subject the occupants to serious risk of injury or death. By examining the collision interaction schematic 100 it is also clear that the end surface area of the projecting load 103 is much smaller than the rear surface area of the truck-semi-trailer combination 102 and can deceive the operator of the automobile 101 as to his/her actual proximity to the projecting load 103. This deception could certainly cause a collision where one would otherwise not have taken place.

Referring now to FIGS. 2a and 2b, there is illustrated an attenuated collision interaction schematic generally referred to by reference numeral 200. The attenuated collision interaction schematic 200 shows an automobile 201 following a truck-trailer/semitrailer combination 202. The truck-semitrailer combination 202 is carrying a projecting load 203 which is elevated and projecting past the rearmost point of the truck-semitrailer 202 proper. The projecting load can be fastened to the semitrailer at one or more points, such as at fasteners 203a. Such fasteners can be any type known in the art, such as clamps or straps. The fasteners 203a can also be a portion of the semitrailer which projects from the surface that on which the projecting load lies. Additionally, the projecting load 203 is outfitted with a collision barrier device 204.

The collision barrier device 204 comprises a body portion 204a having an impact portion, such as a large surface area portion 204b that is positioned for impact with the vehicle 201. The body portion 204a may include stiffening portions, such as ribs and further includes a means for fastening the same to the projecting load. Such means can be any fastening means known in the art as long as the body portion 204a is securely fastened to a projecting end of the projecting load such that the body portion 204a will not substantially move axially along the projecting load during an impact. Such fastening means can include one or more clamps 204c which can be sized to fit a particular size and shape projecting load or be adjustable to fit a variety of size and/or shapes. The clamps 204c can be one or more U-bolts having two threaded ends, each threaded end having a corresponding through hole on the body portion 204a and nuts secured to the threaded ends to secure the body portion 204a to the projecting load 203. Other types of fastening means may include straps or clamps that are tightened by a lever or knob action. Still other fastening means can be binding with flexible tensile members (ropes, chains, straps, etc), clamping between one or more rigid jaws, or using features of the projecting load itself such as drilled holes, flanges, or the geometry of the projecting load itself. Spikes, knurling, or other traction-promoting features or coatings can also be used on any components of the fastening means where the same contact the projecting load to aid in gripping the projecting load.

Furthermore, the fastening means can have a closed end 204d (FIG. 2c) for fitting over the end of the projecting load so as to minimize any relative axial movement (in the direction of travel) between the body portion 204a and the projecting load 203 during an impact. The body portion 204a can be any material having sufficient strength to resist the impact of the vehicle, such as metal or polymer, fiberglass or carbon fiber. Furthermore, the large surface area portion 204b can be attached to or integral with the body portion 204a and can also be formed of any material and/or of a sufficient size and/or shape to resist/absorb/mitigate/attenuate the impact of the vehicle.

A means can also be provided (not shown) to change the elevation of the large surface area portion relative to the projecting load either prior to installation or after detachment from the projecting load.

It is clear that, by examining the attenuated collision interaction schematic 200, if the automobile 201 collides with the collision barrier device for projecting loads 204, the collision barrier device 204 will firstly lower the effective impact elevation of the collision interaction and secondly increase the surface area of the collision interaction. By lowering the elevation and increasing the surface area of the collision interaction, the collision survivability systems of the automobile 201 (bumpers, crumple zones, air bags, safety belts, etc) may now act to reduce the risk of injury or death of the occupants of the automobile 201. The fasteners 203a will counteract any moment caused by the lower impact acting to dislodge the projecting load 203 from the carrier.

Additionally, the larger surface area of the collision barrier device for projecting loads 204 as compared to the projecting load 203 alone, will increase the likelihood that the operator of the automobile 201 will be aware of his/her true proximity to the projecting load 203 and therefore increase the likelihood that the operator of the automobile 201 will maintain a safe following distance which, in turn can serve to avoid a collision in the first place.

Figure 3A:
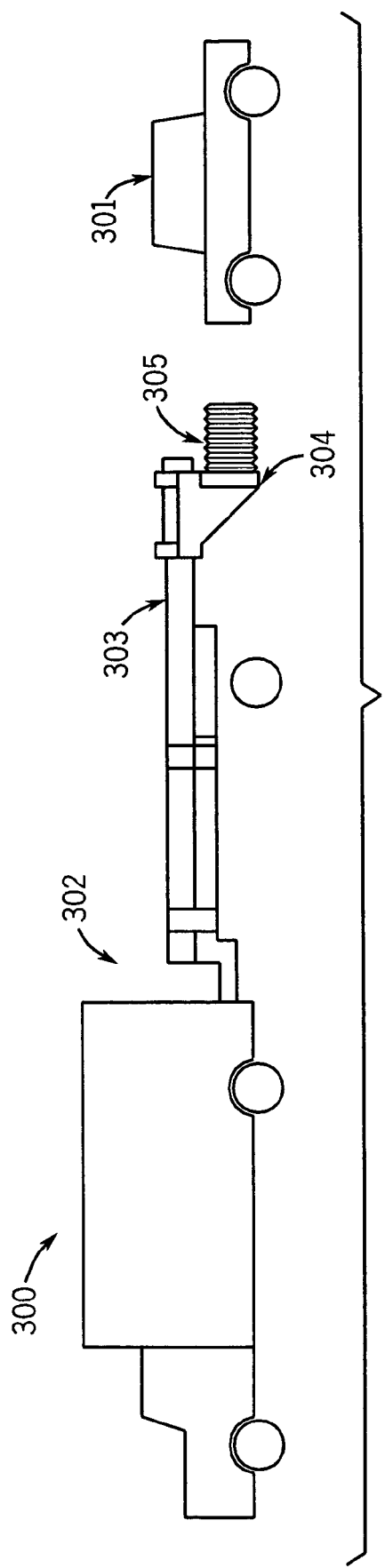
FIG. 3a illustrates a side view of an embodiment of a collision interaction system between an automobile and a projecting load with a collision barrier device for projecting loads.
Figure 3B:
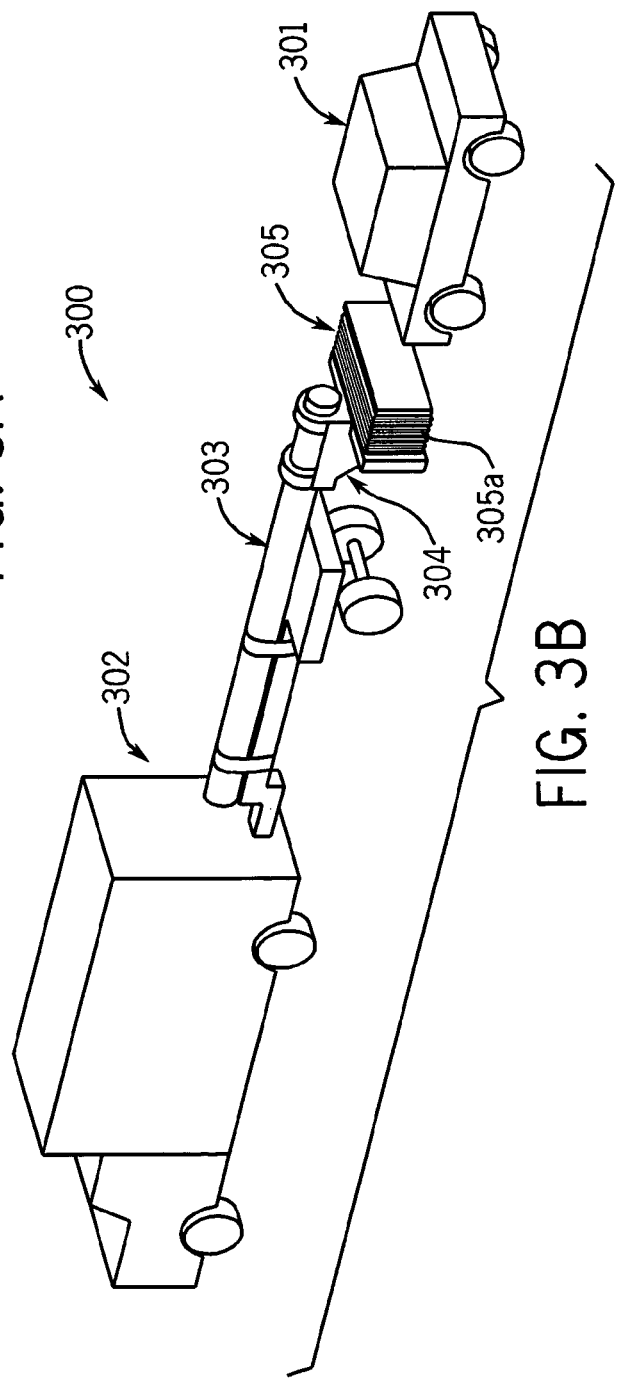

Referring now to FIGS. 3a and 3b, there is illustrated a highly attenuated collision interaction schematic generally referred to by reference numeral 300. The highly attenuated collision interaction schematic 300 shows an automobile 301 following a truck-semitrailer combination 302. The truck-semitrailer combination 302 is carrying a projecting load 303 which is elevated and projecting past the rearmost point of the truck-semitrailer 302 proper. The projecting load 303 is outfitted with a collision barrier device 304 having a similar construction to that described above with regard to FIGS. 2a, 2b and 2c. Additionally, the collision barrier device for projecting loads 304 is outfitted with an additional impact mitigation system 305. The impact mitigation system 305 can be a pleated container 305a which is easily deformed in the axial direction of the projecting load. Such a pleated container 305a can be formed of a polymer and may be additionally filled with a mitigation material, such as sand or other solid, water or other liquid or gel or other semi-solid (or any combination thereof).

It is clear that, by examining the highly attenuated collision interaction schematic 300, if the automobile 301 collides with the collision barrier device for projecting loads 304, the collision barrier device for projecting loads 304 will firstly lower the effective impact elevation of the collision interaction and secondly increase the surface area of the collision interaction. By lowering the elevation and increasing the surface area of the collision interaction, the collision survivability systems of the automobile 301 (bumpers, crumple zones, air bags, safety belts, etc) may now act to reduce the risk of injury or death of the occupants of the automobile 301. Additionally, the inclusion of the additional impact mitigation system 305 will absorb or dissipate kinetic energy from the impact of the automobile 301, further reducing the risk of injury or death to the occupants of the automobile 301. Additionally, the increased area and volume of the collision barrier device for projecting loads 304 in combination with the impact mitigation system 305 as compared to the end area of the projecting load 303 alone will serve to alert the operator of the automobile 301 as to the presence of the projecting load 303 and his/her true proximity to the projecting load 303. This increased alertness can surely work towards avoiding a collision in the first place.

Figure 4A:
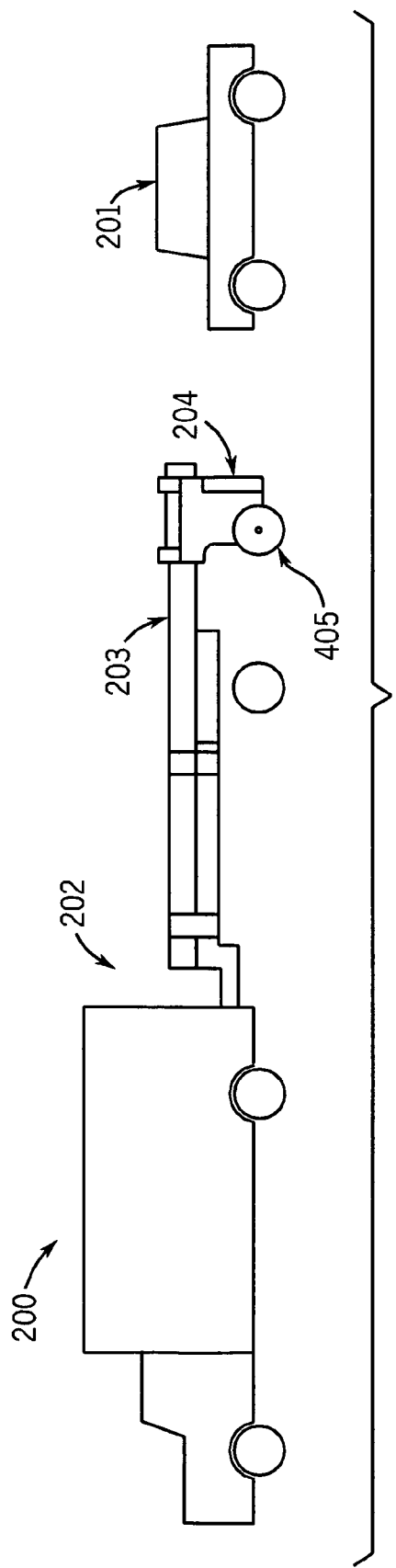
FIG. 4a illustrates an isometric view of another embodiment of a collision barrier device for projecting loads with wheels provided for maneuvering.
Figure 4B:
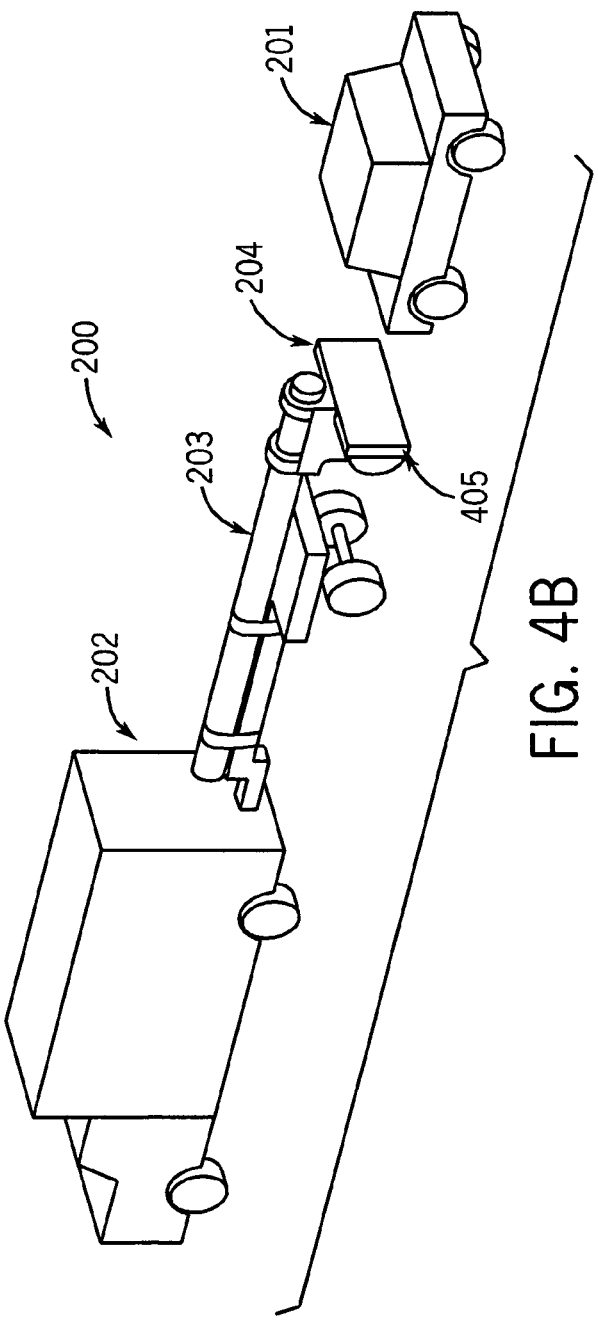

Referring now to FIGS. 4a and 4b, another embodiment of the collision barrier device 404 is shown with its own set of wheels 405 to assist in maneuvering. Although shown with regard to the embodiment of FIGS. 2a and 2b, such wheels 405 can be utilized in any such variations and/or embodiments disclosed herein.

Figure 5A:
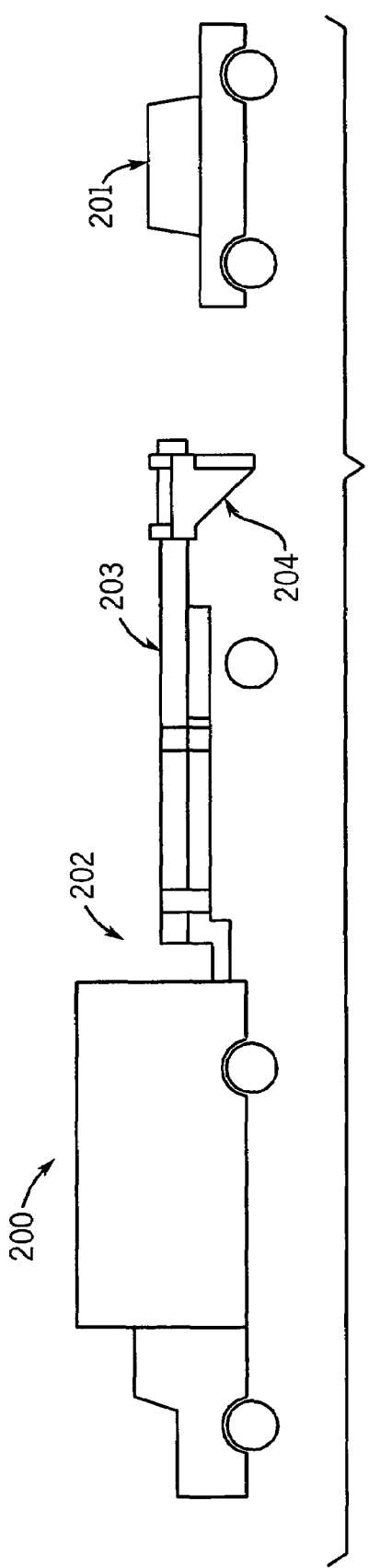
FIG. 5a illustrates a side view of another embodiment of the collision barrier device for projecting loads with a protrusion for preventing forward motion along the long axis of the projecting load.
Figure 5B:
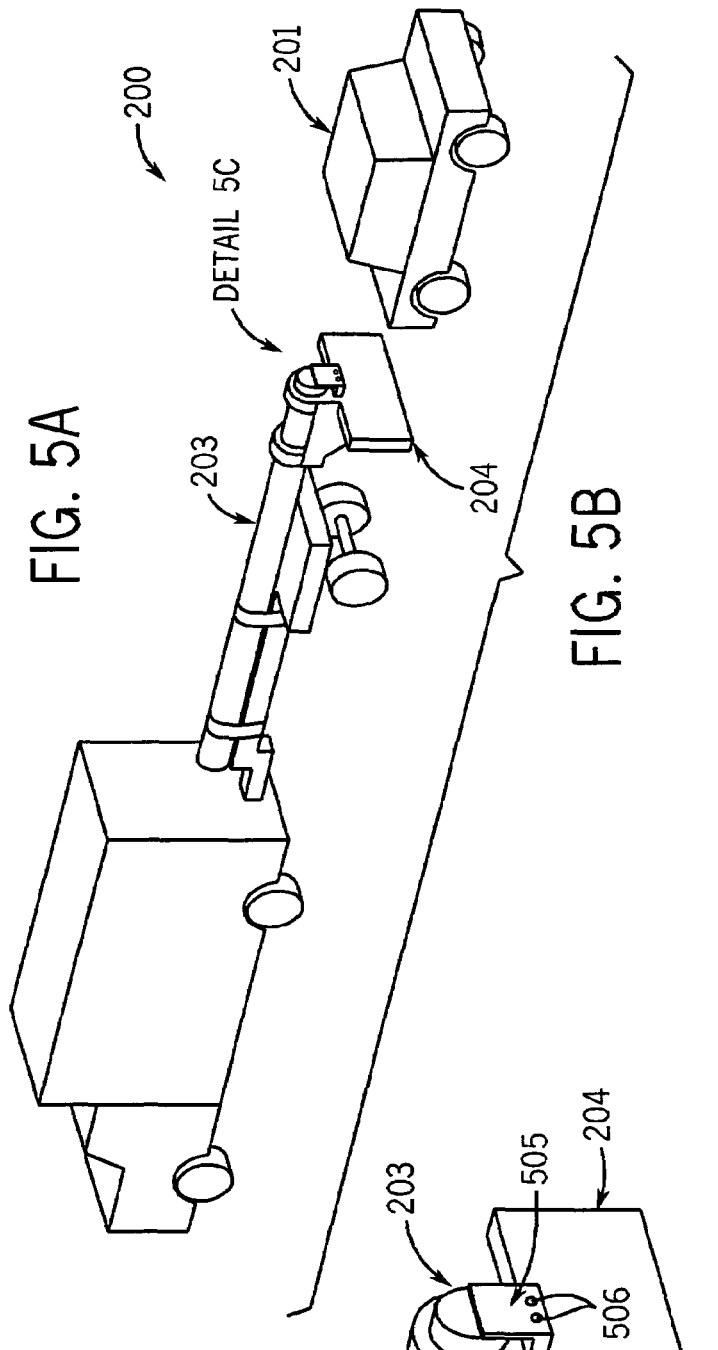
Figure 5C:
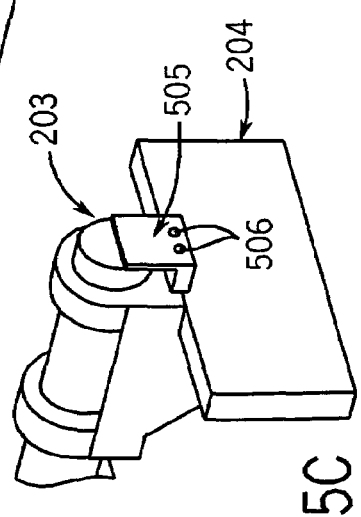

Referring now to FIGS. 5a and 5b, a protrusion 505 can be used for preventing sliding of the body portion 204a in the axial direction of the projecting load. The protrusion 505 can be fastened to the body portion 204a by any means known in the art, such as by one or more bolts 506. The protrusion 505 acts similarly to the closed end 204d discussed above with regard to FIG. 2d. Again, although shown with regard to the embodiment of FIGS. 2a and 2b, such protrusion 505 can be utilized in any such variations and/or embodiments disclosed herein.

Figure 6A:
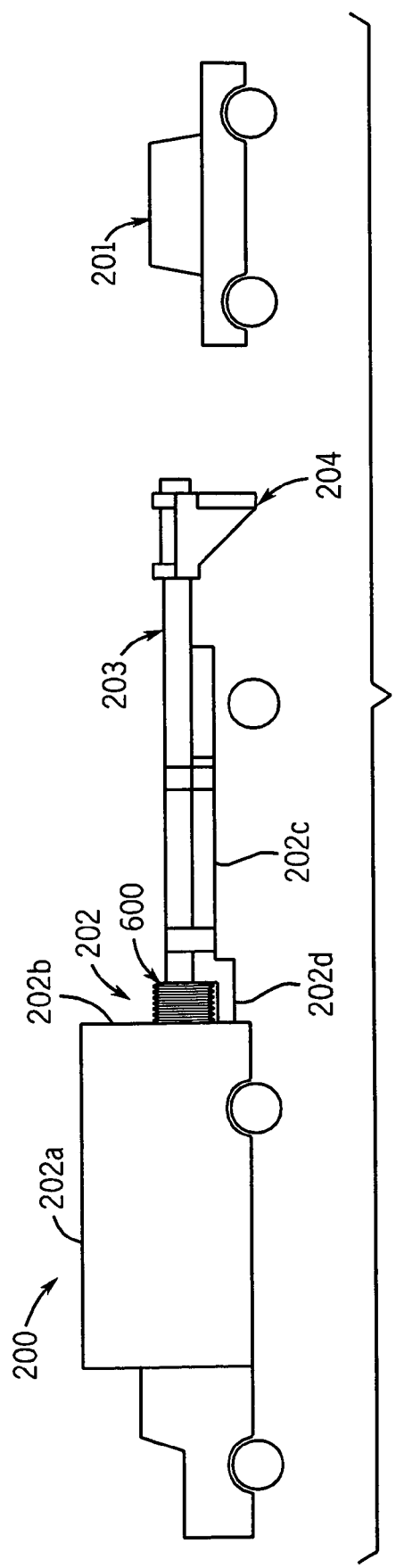
FIG. 6a illustrates a side view of a collision interaction system between an automobile and a projecting load with a collision barrier device for projecting loads and an impact mitigation system disposed at forward end of the projecting load.
Figure 6B:
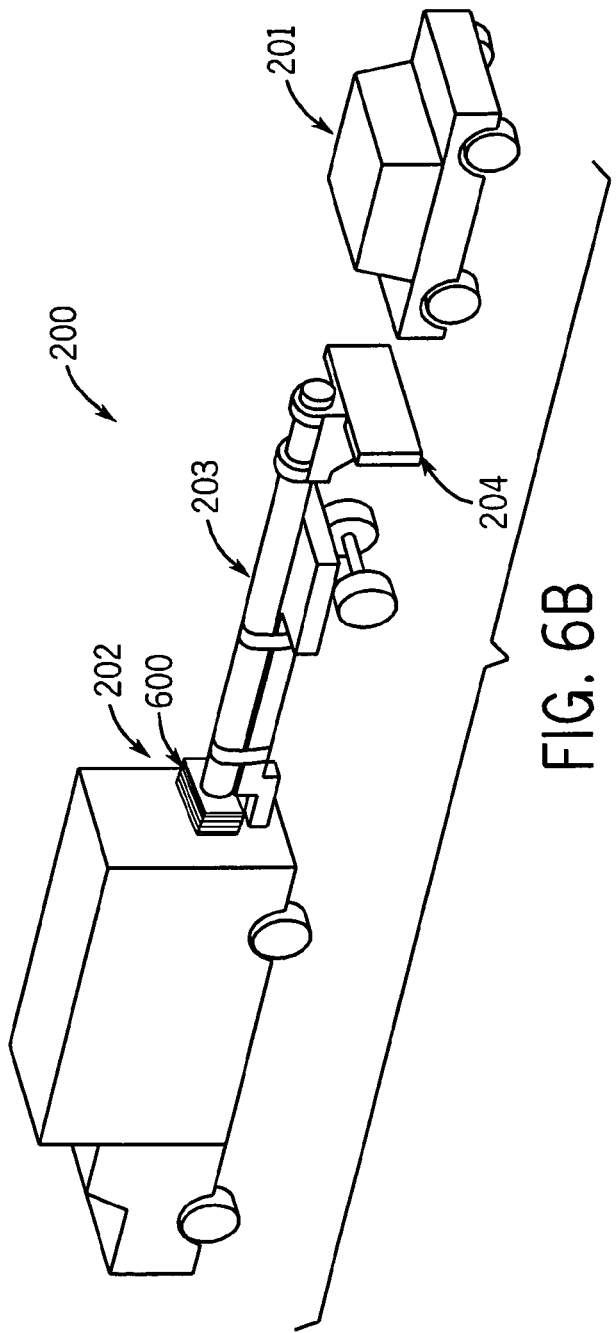
Figure 6C:
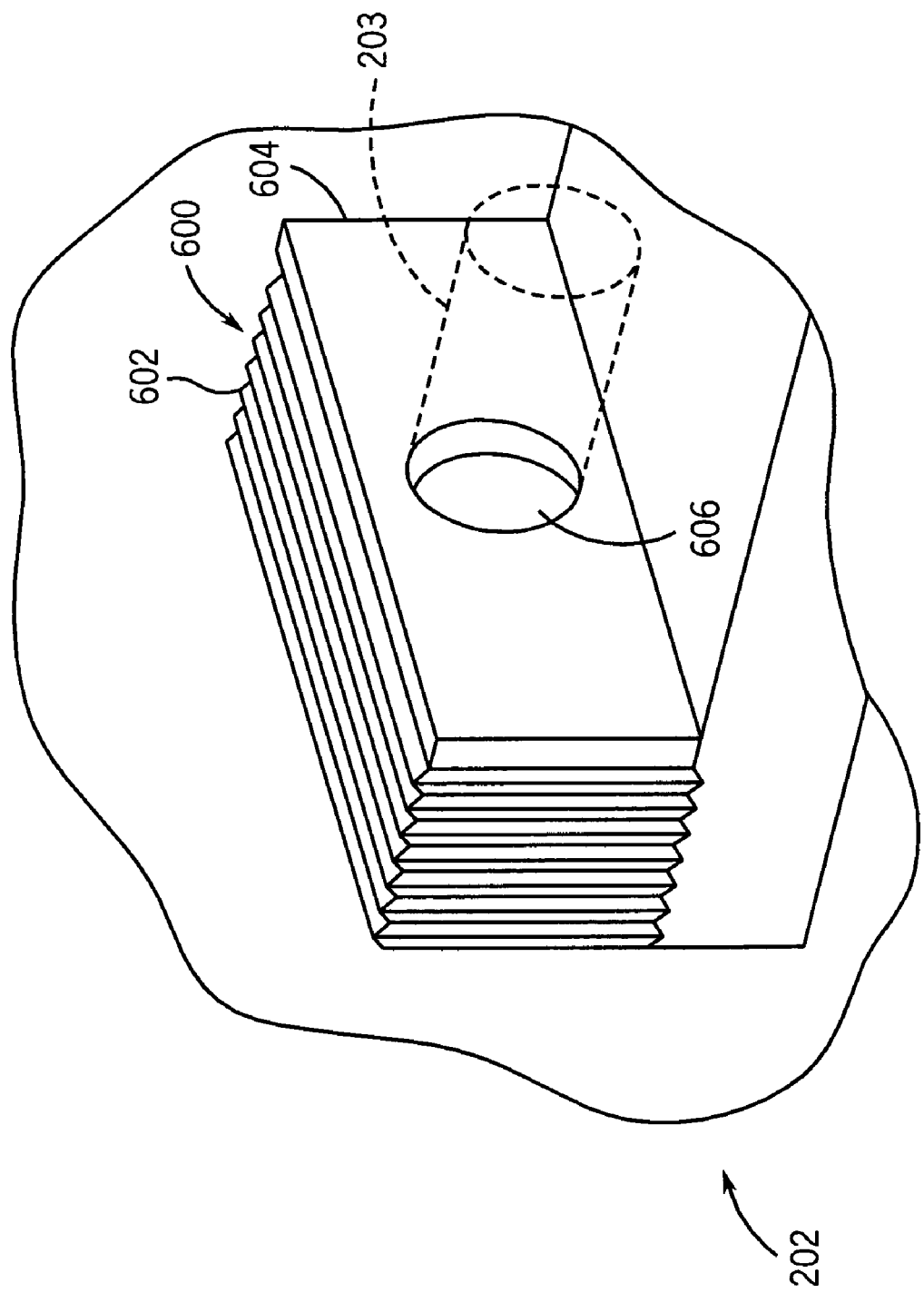
FIG. 6c illustrates an isometric view of impact mitigation system of FIG. 6b.

Referring now to FIGS. 6a and 6b, the impact mitigation system 600 can be disposed between a second end of the projecting load and the truck, such as being attached to a back surface 202b of the truck 202a or a forward portion 202d of the semi-trailer 202c. The impact mitigation system 600 can include a pleated container 602 similar to that described above with regard to FIGS. 3a and 3b and have any of the fillers described above. Additionally, as shown in FIG. 6c, the pleated container 602 can have a plate covering 602 for spreading a force caused by an impact of the end of the projecting load over a greater area, such as over the entire face of the pleated container 602. The plate 604 can further have a hole, such as a blind hole 606 for accepting a corresponding end or other portion of the projecting load 203. Again, although shown with regard to the embodiment of FIGS. 2a and 2b, such impact mitigation system 600 can be utilized in any such variations and/or embodiments disclosed herein.

A means to electronically measure the distance between the rearmost point of the collision barrier device and the closest object directly behind the same can be provided. This electronic measurement may then be used to alert persons in the vicinity of the potential hazard of the projecting load if the distance between the invention and the object becomes closer than some predetermined threshold. The alerting may be an LED display stating "too close" or similar language or merely a flashing light and/or audible warning.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A crash barrier device for attenuating an impact of a first vehicle on a second vehicle carrying a projecting load having at least a cantilevered portion which is cantilevered from a rear end of the second vehicle, the crash barrier device comprising:
   a body portion having at least an impact portion, the impact portion comprising a plate having a surface area in a plane perpendicular to a direction of travel that is greater than a surface area of the cantilevered portion in the plane; and
   a fastening portion configured to rigidly fasten the body portion to the cantilevered portion
   wherein the impact portion and the fastening portion are configured such that the impact portion is nearer to a surface traveled on by the vehicle than the fastening portion.

2. The crash barrier device of claim 1, wherein the fastening portion comprises one or more cylindrical clamps for clamping a cylindrical portion of the portion cantilevered from the rear end of the second vehicle.

3. The crash barrier device of claim 2, wherein the one or more clamps comprises two clamps.

4. The crash barrier device of claim 1, wherein the body portion and impact portion are integrally formed.

5. The crash barrier device of claim 1, wherein the fastening portion comprises a closed end for fitting over a corresponding end of the projecting load to prevent movement, in the direction of travel of the vehicle, of the body portion and projecting load.

6. The crash barrier device of claim 1, further comprising an impact mitigation system for absorbing at least a portion of an impact on the impact surface.

7. The crash barrier device of claim 6, wherein the impact mitigation system comprises a pleated container disposed on at least a portion of the impact surface.

8. The crash barrier device of claim 7, further comprising one of a solid, semi-solid, liquid or gel disposed in a cavity of the pleated container.

9. The crash barrier device of claim 1, further comprising one or more wheels rotatably disposed on the body portion and configured so as to have a surface thereof rotatably contact the surface upon which the vehicle travels.

10. The crash barrier device of claim 1, wherein the fastening portion comprises a protrusion disposed on the body portion and having at least a portion fitted over a corresponding end of the projecting load to prevent movement, in the direction of travel of the vehicle, of the body portion and projecting load.

11. A system for attenuating an impact of a first vehicle on a second vehicle carrying a projecting load having at least a cantilevered portion cantilevered from a rear end of the second vehicle, the system comprising:
    a trailer having at least one set of wheels and means for fastening the trailer to a powered vehicle; and
    a crash barrier device having:
        a body portion having at least an impact portion, the impact portion comprising a plate having a surface area in a plane perpendicular to a direction of travel that is greater than a surface area of the cantilevered portion in the plane; and
        a fastening portion configured to rigidly fasten the body portion to the cantilevered portion;
        wherein the impact portion and the fastening portion are configured such that the impact portion is nearer to a surface traveled on by the vehicle than the fastening portion.

12. The system of claim 1, further comprising an impact mitigation system for absorbing at least a portion of an impact on the impact surface disposed at a forward end, in the direction of vehicle travel of the trailer.

13. The system of claim 12, wherein the impact mitigation system comprises a pleated container.

14. The system of claim 13, further comprising one of a solid, semi-solid, liquid or gel disposed in a cavity of the pleated container.

15. The system of claim 13, further comprising a plate for distributing an impact across at least a portion of a surface area of the pleated container.

16. The system of claim 15, wherein the plate includes a hole for accepting a corresponding forward end portion, the direction of vehicle travel, of the projecting load.

17. The system of claim 11, wherein the fastening portion comprises one or more cylindrical clamps for clamping in a cylindrical portion of the portion cantilevered from the rear end of the second vehicle.

18. The system of claim 17, wherein the one or more clamps comprises two clamps.

19. The system of claim 11, wherein the body portion and impact portion are integrally formed.

20. The system of claim 11, wherein the fastening portion comprises a closed end for fitting over a corresponding end of the projecting load to prevent movement, in the direction of travel of the vehicle, of the body portion and projecting load.

21. The system of claim 11, further comprising one or more wheels rotatably disposed on the body portion and configured so as to have a surface thereof rotatably contact the surface upon which the vehicle travels.

22. The system of claim 11, wherein the fastening portion comprises a protrusion disposed on the body portion and having at least a portion fitted over a corresponding end of the projecting load to prevent movement, in the direction of travel of the vehicle, of the body portion and projecting load.

23. The system of claim 11, further comprising fastening means for fastening the projecting load to the trailer.

24. A method for attenuating an impact of a first vehicle on a second vehicle carrying a projecting load having at least a portion cantilevered from a rear end of the second vehicle, the method comprising:

fastening a body portion having at least an impact portion to the portion cantilevered from the rear end of the second vehicle; and configuring at least a portion of the impact portion and the fastening portion such that the impact portion is nearer to a surface traveled on by the vehicle than the fastening portion so as to lower a point of the impact towards a surface traveled on the first and second vehicles.

25. The method of claim 24, further comprising providing the impact portion with a surface area greater than a surface area of the end portion of the projecting load so as to increase a likelihood that an operator of the first vehicle will be aware of a proximity to the projecting load.

* * * * *